United States Patent
Maeda

(10) Patent No.: US 7,764,800 B2
(45) Date of Patent: Jul. 27, 2010

(54) VEHICLE SOUND SYNTHESIZER

(75) Inventor: Osamu Maeda, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1769 days.

(21) Appl. No.: 10/791,105

(22) Filed: Mar. 2, 2004

(65) Prior Publication Data
US 2004/0170288 A1 Sep. 2, 2004

Related U.S. Application Data

(62) Division of application No. 09/612,041, filed on Jul. 7, 2000, now Pat. No. 6,859,539.

(51) Int. Cl.
*H04B 1/00* (2006.01)
*H03G 3/00* (2006.01)

(52) U.S. Cl. .......................... 381/86; 381/61

(58) Field of Classification Search .............. 381/61, 381/86, 302
See application file for complete search history.

(56) References Cited

U.S. PATENT DOCUMENTS

| 5,237,617 | A | * | 8/1993 | Miller ............... 381/61 |
| 5,635,903 | A | * | 6/1997 | Koike et al. ........... 340/441 |
| 5,734,726 | A | * | 3/1998 | Truchsess ............. 381/61 |
| 5,835,605 | A |   | 11/1998 | Kunimoto |

FOREIGN PATENT DOCUMENTS

| JP | 51-21625 U | 2/1976 |
| JP | 55-142350 U | 10/1980 |
| JP | 56-171501 U | 12/1981 |
| JP | 57-120000 U | 7/1982 |
| JP | 59-137838 U | 9/1984 |
| JP | 62-194144 U | 12/1987 |
| JP | 64-59393 A | 3/1989 |
| JP | 3-279045 A | 12/1991 |
| JP | 4-152395 A | 5/1992 |
| JP | 04-362881 A | 12/1992 |
| JP | 4-364811 A | 12/1992 |

(Continued)

OTHER PUBLICATIONS

Official communication issued in counterpart Japanese Application No. 127123, drafted on Aug. 18, 2003.

(Continued)

*Primary Examiner*—Vivian Chin
*Assistant Examiner*—George Monikang
(74) *Attorney, Agent, or Firm*—Keating & Bennett, LLP

(57) ABSTRACT

A sound synthesizer for a vehicle includes a driving operation detector that detects an operation amount of a driving operation input device by a driver. A speed calculator calculates a revolution speed of a drive unit based on the detected operation amount. A sound controller outputs a sound control signal based on an input of the operation amount and based on the revolution speed. A memory stores drive sound data in advance. A synthesized sound output generator reads out drive sound data from the memory and outputs a voltage signal corresponding to a sound pressure signal. The sound controller outputs sound control signals so that the drive sound data within a range of the operational state corresponding to the inputted operation amount and the revolution speed is repetitively played.

2 Claims, 13 Drawing Sheets

FOREIGN PATENT DOCUMENTS

| | | |
|---|---|---|
| JP | 5-53594 A | 3/1993 |
| JP | 05-208636 A | 8/1993 |
| JP | 6-289887 A | 10/1994 |
| JP | 07-032948 A | 2/1995 |
| JP | 07-036504 U | 7/1995 |
| JP | 7-182587 A | 7/1995 |
| JP | 07-306687 A | 11/1995 |
| JP | 07-322402 A | 12/1995 |
| JP | 08-044383 A | 2/1996 |
| JP | 08-152894 A | 11/1996 |
| JP | 09-081171 A | 3/1997 |
| JP | 9-134188 A | 5/1997 |
| JP | 11-184487 | 7/1999 |
| JP | 11-249672 | 9/1999 |

OTHER PUBLICATIONS

Official communication issued in counterpart Japanese Application No. 127123, drafted on Apr. 19, 2004.
Official communication issued in counterpart Japanese Application No. 090557, drafted on Dec. 15, 2004.
Official communication issued in counterpart Japanese Application No. 090557, drafted on Mar. 29, 2005.
Official communication issued in counterpart Japanese Application No. 069528, drafted on Aug. 3, 2007.
Official communication issued in counterpart Japanese Application No. 069529, drafted on Aug. 3, 2007.

* cited by examiner

EXAMPLE OF DATA STORAGE INSIDE ENGINE SOUND MEMORY MEANS

EXAMPLE OF ENGINE SOUND PRESSURE WAVEFORMS

FLUCTUATION IN RAPID
ACCELERATION/DECELERATION PERIODS

VEHICLE SOUND SYNTHESIZER

CROSS-REFERENCE TO RELATED APPLICATIONS

This application is a divisional of prior U.S. patent application Ser. No. 09/612,041, filed on Jul. 7, 2000, now U.S. Pat. No. 6,859,539, which is incorporated by reference herein.

BACKGROUND OF THE INVENTION

1. Field of the Invention

The present invention is in the field of sound synthesizers that produce sounds to simulate the sounds produced by an automobile or other motorized vehicle.

2. Description of the Related Art

Racing car games are available for use with televisions and computers. Driving simulators have become popular recently. For such games and simulators, synthesizers have been employed to produce engine sounds (e.g., engine firing sounds or driving sounds, including mechanical sounds and intake/exhaust sounds) to improve the impression that the "driver" is driving a real car. Conventionally, a so-called actual sound loop reproduction method has been commonly used for synthesizers. In such conventional synthesizers, several seconds of actual driving sounds (e.g., engine sounds) are recorded as a digital data during a normal operational state. Such drive sound data (i.e., engine sound data) is repetitively played by altering the pitch and sound volume depending on the operational state of the game or simulation.

In an exemplary system, the drive sound data in such an actual sound loop reproducing method is sampled at a sampling rate (i.e., a sampling frequency) of 44.1 kHz. Thus, a sound pressure value of the sampled sound is transmitted from an engine at a cycle (i.e., period) of about $2.268 \times 10^{-5}$ second. The sequential group of sound pressure data sampled at this particular cycle is considered to be digital data for engine sound pressure waveforms (i.e., the sound data represented as the digital signal). A greater sampling rate can be used so that the reproduced sound pressure waveform is closer to the sound pressure waveform of the actual driving sound.

In reproducing such driving data as a driving sound corresponding to an operational state (i.e., an engine speed or an acceleration rate) of a vehicle, if a speed of the simulated drive unit at a particular operational state to be reproduced matches a speed the simulated drive unit at a particular operational state to be reproduced matches a speed of the actual drive unit at the normal operational state that is recorded as a digital signal, sound pressure waveforms that are the same as the driving sound at the normal operational state can be reproduced by reproducing the recorded sequential sound pressure data at the same reproduction rate as the sampling rate (namely, at the same reproduction cycle as the sampling cycle).

Conversely, for an operation to increase the revolution speed of the drive unit, the pitch of the reproduced sound is elevated to a higher pitch than the pitch of the actual driving sound that was recorded as a digital signal at the normal operational state. The increase in pitch is accomplished by elevating the sound reproduction rate (i.e., by shortening the reproduction cycle to elevate the reproduction frequency) and by increasing the frequency of the reproduction of the stored sequential sound pressure data by shortening the waveform in a time axis.

Further, for an operation to decrease the revolution speed of the drive unit, the sound is reproduced by modifying the pitch in proportion to the pitch of the decreasing speed of the drive unit by reducing the sound reproduction rate.

In this actual sound loop reproduction method, the sound can be reproduced as close to the actual sound as possible under the normal operation pattern which is proximate to the actually recorded speed of the drive unit. However, the sound reproduction is not so successful in a transitional period between two operational states and for other operational states beyond the particular operational state of the actually recorded sound. The reproduced sound turns out to be an unnatural sound even if the pitch and sound volume are modified.

A conventional solution for this problem is to record various types of actual driving sounds as drive sound data for a duration of several seconds. Particular drive sound data recorded at a particular operational state is selectively read out if it matches or if it is at least proximate to an operation corresponding to a certain driving operation. Then, this drive sound data for several seconds is repetitively reproduced by altering the pitch or volume. However, the storage of such various types of actual driving sounds leads to an increased capacity of the memory means. The expanded capacity of the memory means is an obstacle to providing inexpensive products.

In addition, such a conventional actual sound loop reproduction method requires the storage of different types of the engine sound depending on the number of cylinders and alignment of the cylinders. Such a requirement leads to an increase in the required memory capacity and to increased manufacturing costs.

There is another recent trend for the TV games and computer games. In such a recent trend, the game machines and personal computers are connected to a server through a communication line by which two operators can play against each other on line. For such online type games, pictures and sound data that require enormous memory capacity and thus tend to delay the progress of the game are previously stored in the game machines and personal computer.

For the online games in which two players play against each other through the communication lines, if the sound data capacity is increased, it takes more time to transfer the data. For example, for two seconds of data of 16-bit stereo data at a 44.1 kHz sampling frequency, the required memory capacity is approximately 353 kBytes. If such data is transferred at a rate of 64 kbps, it takes about three quarters of a minute to complete the transfer. In addition, plural segments of transferred sound data typically need to be transferred. As a result, it requires a long transfer time before the game actually begins. Thus, for the vehicle operating game, it is difficult to switch the type of synthesized sound when changing it to another game.

Conventionally, for the online games, the sound data is stored in advance in the game machines and personal computers from CD-ROMs and floppy disks. However, it may be sometimes overwhelming for a player to store each sound data because the player most likely plays a large number of different games. In addition, such sound data occupies major portions of the memory device of the game machines and personal computers.

SUMMARY OF THE INVENTION

One aspect of the present invention is a sound synthesizer for a vehicle that includes a driving operation detector that detects an operation amount of a driving operation input device by a driver. A speed calculator calculates a revolution speed of a drive unit based on the detected operation amount. A sound controller outputs a sound control signal based on an input of the operation amount and based on the revolution speed. A memory stores drive sound data in advance. A synthesized sound output generator reads out drive sound data from the memory and outputs a voltage signal corresponding to a sound pressure signal. The memory divides the operational state of the drive unit into plural stages by using the operation amount and the revolution speed as parameters. The memory stores each driving sound which is recorded in the middle of each operational period as digital data of the driving sound at a wavelength of a sound pressure waveform which is substantially the same as a cyclic sound interval of the drive unit. The sound controller outputs sound control signals so that drive sound data within a range of an operational state corresponding to the inputted operation amount and the revolution speed is repetitively played. Preferably, the drive unit is a multiple cylinder internal combustion engine, and the cyclic sound interval refers to a firing interval between each cylinder of the internal combustion engine. Also, preferably, the memory stores sound pressure waveforms as driving data. The sound pressure waveforms have substantially the same wavelength as the cyclic sound interval of the drive unit, and the sound controller outputs sound control signals so that drive sound data is played at an interval corresponding to the cyclic sound interval of the drive unit. Preferably, the sound control signals are repetitively outputted at an interval corresponding to the cyclic sound interval of the drive unit and are controlled so that at least one of the sound volume, pitch or tone of the drive sound data read from the memory is modified. Preferably, a reproduction rate for converting digital data to analog data varies depending on a ratio between an actually recorded engine speed and calculated engine speed. In particularly preferred embodiments, the drive sound data for generating the sound pressure waveforms stored in the memory is prepared at a server connected to the sound synthesizer through a communication line, and the drive sound data is transmitted to the memory from the server through the communication line.

Another aspect of the present invention is a sound synthesizer for a vehicle having a driving operation detector that detects an operation amount of a driving operation input device activated by a driver. A speed calculator calculates a revolution speed of a drive unit based on the detected operation amount. A sound controller outputs a sound control signal based on an input of the operation amount and the revolution speed. A memory stores drive sound data in advance. A synthesized sound output generator outputs drive sound data from the memory and outputs a voltage signal corresponding to a sound pressure signal. The memory divides the operational state of the drive unit into plural stages by using the operation amount and the revolution speed as parameters. The memory stores each driving sound, which is recorded in the middle of each operational period as digital data of the driving sound at a wavelength of a sound pressure waveform which is substantially the same as a cyclic sound interval of the drive unit. The sound controller is arranged to output sound control signals so that the drive sound data corresponding to the revolution speed and the cyclic interval of the drive unit is repetitively played. The drive sound data with a unit of the sound pressure waveform stored in the memory is prepared at a server that is connected to the sound synthesizer through a communication line, and at the time of use, the drive sound data is transmitted to the memory from the server through the communication line. Preferably, the drive unit is an internal combustion engine, and the cyclic sound interval refers to a firing interval between each cylinder of the internal combustion engine.

Another aspect of the present invention is a method of generating synthesized sounds corresponding to sounds generated by operating a vehicle under varying acceleration conditions and operating speeds. In accordance with the method, a plurality of sounds at a plurality of operational states of the vehicle are recorded. The operational states are determined by the acceleration conditions and the operating speeds of the vehicle. The recorded sounds are digitized to produce sound data representing the recorded sounds. The sound data are stored in memory locations indexed by the acceleration conditions and the operating speeds at which the sounds were recorded. The sound data are output from the memory locations indexed by simulated acceleration conditions and operating speeds. The sound data output from the memory locations are converted to audible sounds to simulate the operation of the vehicle.

BRIEF DESCRIPTION OF THE DRAWINGS

The present invention will be described below in connection with the accompanying drawing figures in which:

FIG. 7, comprising

DETAILED DESCRIPTION OF THE PREFERRED EMBODIMENT

In the following, one preferred embodiment of a vehicle sound synthesizer in the present invention is described in reference to the drawings.

Figure 1:
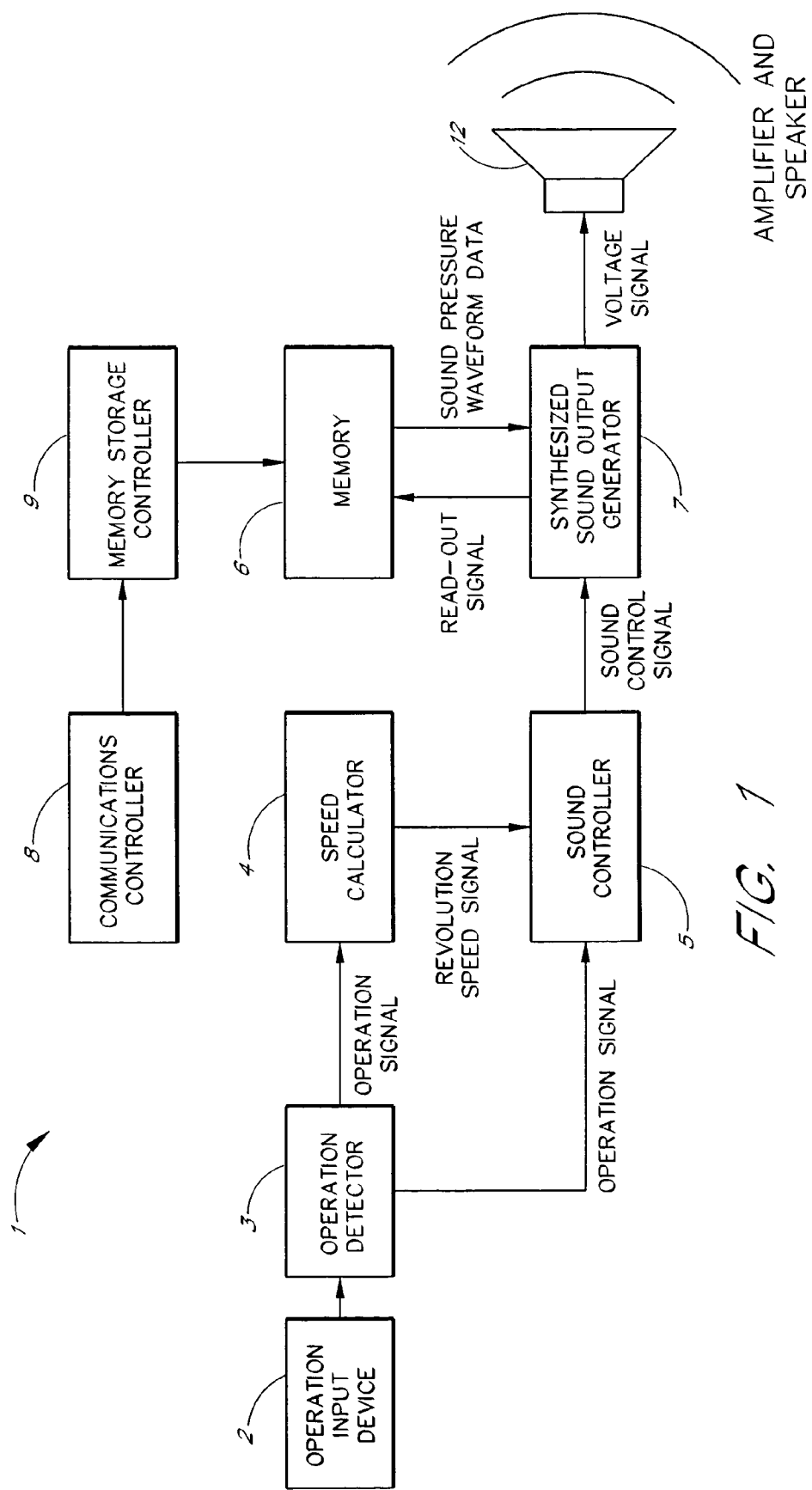
FIG. 1 illustrates a block diagram of one preferred embodiment of the vehicle sound synthesizer of the present invention.

As illustrated in FIG. 1, a sound synthesizer 1 comprises an operation input device 2, an operation detector 3, an engine speed calculator 4, a sound controller 5, a memory 6, and a synthesized sound output generator 7. The sound synthesizer 1 further includes a communication controller 8 and memory storage controller 9 such that drive sound data is stored in the memory 6 through a communication line from an external source (not shown).

In the sound synthesizer 1, synthesized sound is played by a speaker 12 through an amplifier (not shown). An engine speed signal is outputted from the engine speed calculator 4 in response to an operation signal outputted from the operation detector 3. The operation signal is based on an operation amount from the operation input device 2 that is operated by a driver (i.e., a user). The sound synthesizer 1 outputs a sound control signal from the sound controller 5 based on the engine speed signal transmitted from the engine speed calculator 4 and based upon the operation signal transmitted from the operation detector 3. The synthesized sound output generator 7 processes sound data stored in the memory 6 based on the sound control signal and then outputs a voltage signal corresponding to the processed sound data. A more specific embodiment is described in the following in reference to an automobile as a subject vehicle.

The operation input device 2 can take various types of forms depending on usage. For example, a keyboard or mouse is considered to be the operation input device for computer games. For home TV game machines, buttons and operational receivers are considered to be the operation input device. For racing games or driving simulators in arcade game machines, acceleration pedals, brake pedals and shift levers are considered to be operation input devices.

The operation detector 3 detects operational amounts corresponding to magnitudes of acceleration, magnitudes of braking, and shift positions and provides an acceleration signal, a braking signal and a shift position signal to the engine speed calculator 4 and the sound controller 5.

The engine speed calculator 4 calculates an engine speed (i.e., revolution speed) that allows balanced running resistance with engine power (i.e., driving power) based on an operation signal in response to the acceleration magnitude (i.e., operational amount) detected by the operation detector 3 and in response to a power characteristic of the engine (drive unit) that is pre-recorded in a memory device (not shown).

The sound controller 5 outputs a sound control signal to the synthesized sound output generator 7 based on the acceleration signal, the braking signal and the shift position signal (i.e., the operation signals) from the operation detector 3. The synthesized sound output generator 7 is responsive to the sound control signal from the sound controller 5 and reads data representing the engine sound (i.e., driving sound) from the memory 6. The driving sound comprises engine firing sound, mechanical sound and intake/exhaust sounds that are pre-recorded in the memory 6. The sound output generator 7 outputs a voltage signal that corresponds to a sound pressure signal of the engine sound data.

In advance of the operation of the synthesizer 1, the memory 6 stores actually-recorded engine sound as engine sound data. In an embodiment illustrated by a data storage layout table shown in FIG. 2, the engine operational condition is divided into plural stages by using the acceleration degree and the engine speed as parameters. As shown in FIG. 3, actual engine sound (the engine firing sound, mechanical sound and intake/exhaust sound) recorded in the middle of each period is formed as digital data at a unit of a wavelength of the sound pressure waveform matching the firing interval between each cylinder.

For each engine sound data, the actual engine sound is recorded by appropriate methods. For example, microphones can be set at the outside of a vehicle, or microphones can be set inside an automobile to detect sounds as if the sounds are heard by a driver. For a motorcycle, a microphone is installed inside a cyclist's helmet for the recording. Then, for each recorded actual engine sound, a short version of the sound is respectively extracted for further processing into data.

Figure 2:
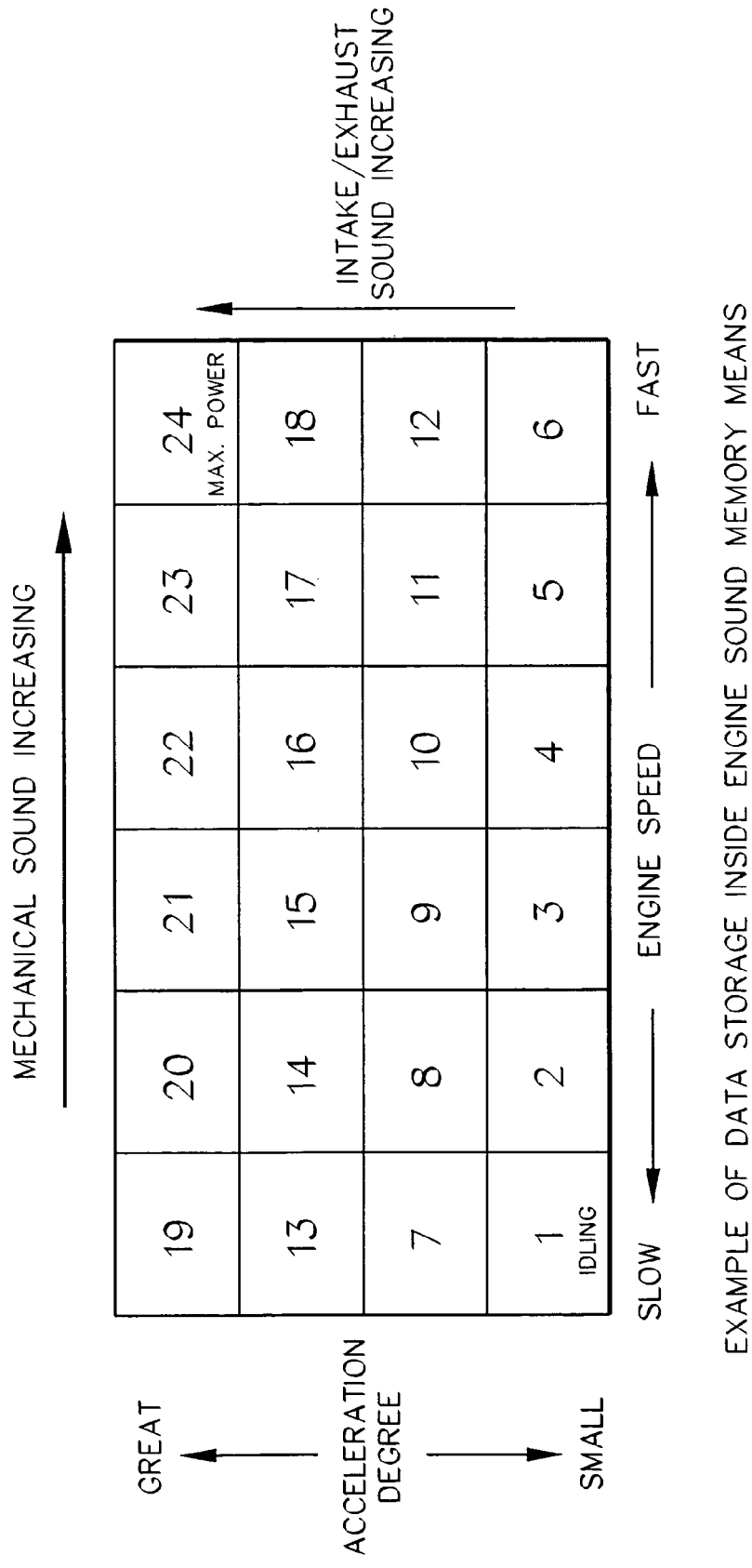
FIG. 2 illustrates an example of data stored in the memory means in the sound synthesizer shown in FIG. 1.
Figure 3:
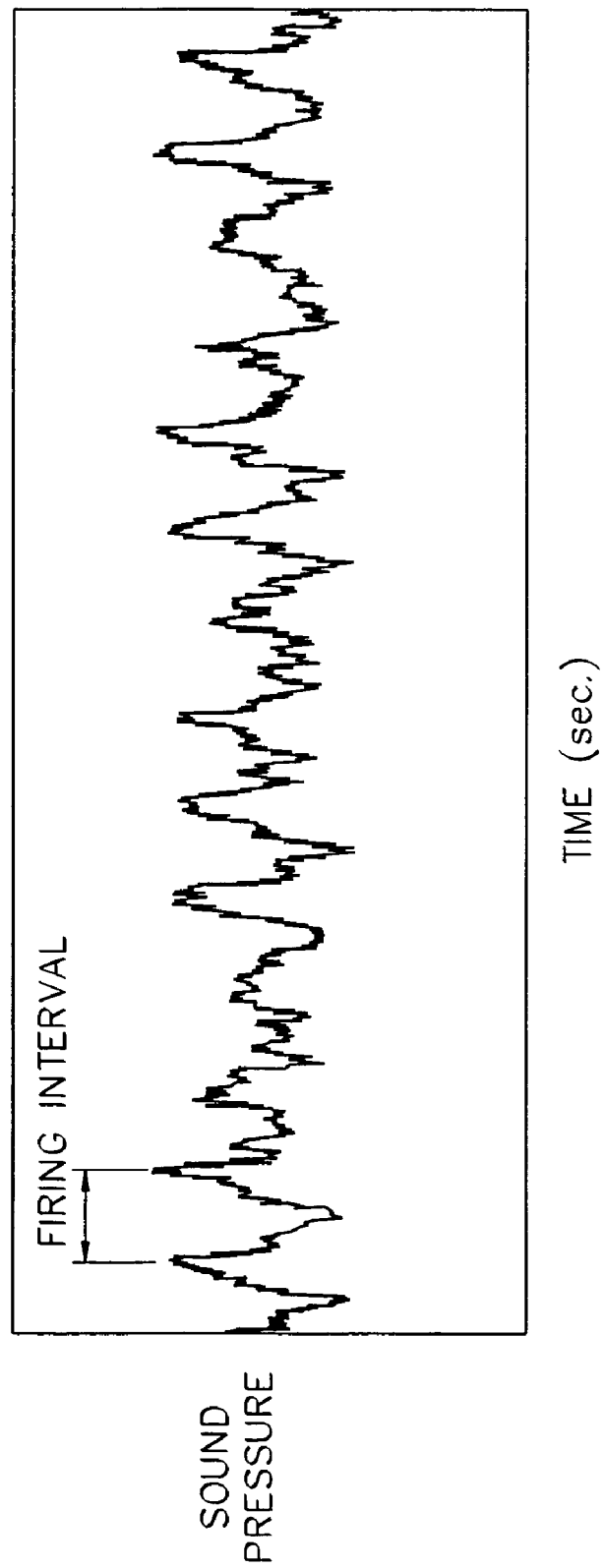
FIG. 3 illustrates an example of engine sound pressure waveforms of each data in the memory as shown in FIG. 2 that are actually recorded at each operational state.

Further, as illustrated by the table in FIG. 2, the engine sound data for each engine operational stage is produced for each gear shift position including a reverse position for each automobile model. Thus, as shown in FIG. 2, the memory 6 stores plural data for each shift position for each automobile model that is needed.

Figure 4:
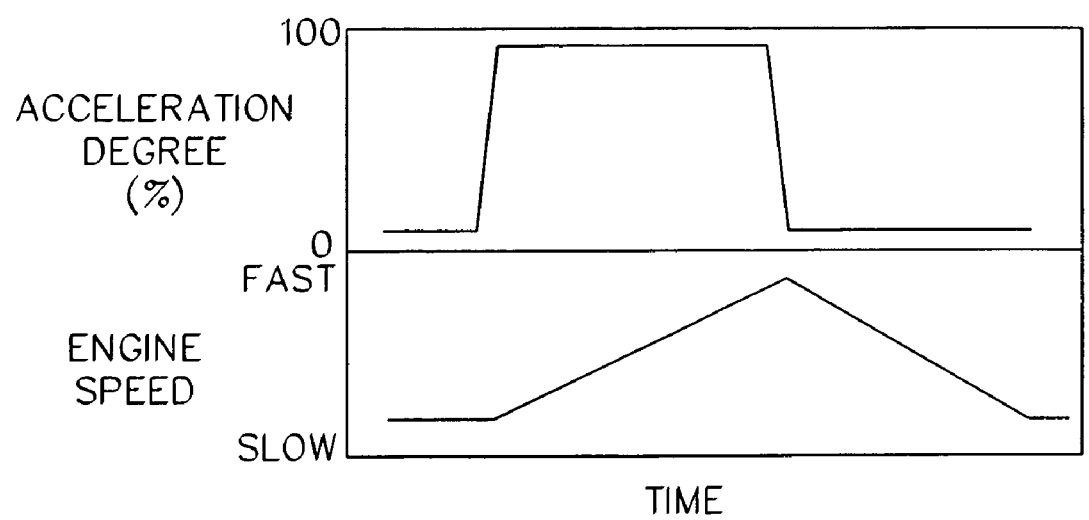
FIG. 4 illustrates how the acceleration degree and engine speed fluctuate with time during the rapid acceleration/deceleration periods.

The following describes the reading of the engine sound data stored in the memory 6. During rapid acceleration/deceleration periods of the actual engine operation, the acceleration degree and engine speed fluctuate independently. If the rapid acceleration and deceleration are performed with the gear fixed, as shown in FIG. 4, there is a time lag between the elevation of the engine speed and the elevation of the degree of acceleration due to the inertia of an engine flywheel and due to the inertia of the vehicle body. Namely, the intake/exhaust sounds of the engine start changing as the acceleration degree increases. The mechanical sound of the engine does not change when the acceleration degree increases; although, it changes as the engine speed starts fluctuating.

Thus, during the rapid acceleration period, the intake and exhaust sounds dominate at the beginning. Then, as the engine speed increases, the engine mechanical sound becomes loud. Conversely, during the rapid deceleration period, the intake and exhaust sounds first decreases. The engine mechanical sound becomes smaller as the engine speed starts decreasing. Further, during a racing period, since there is no inertia of the vehicle body, the response of the engine speed relative to the acceleration degree becomes faster than the response during rapid acceleration/deceleration periods. However, the basic phenomenon remains the same.

Figure 5:
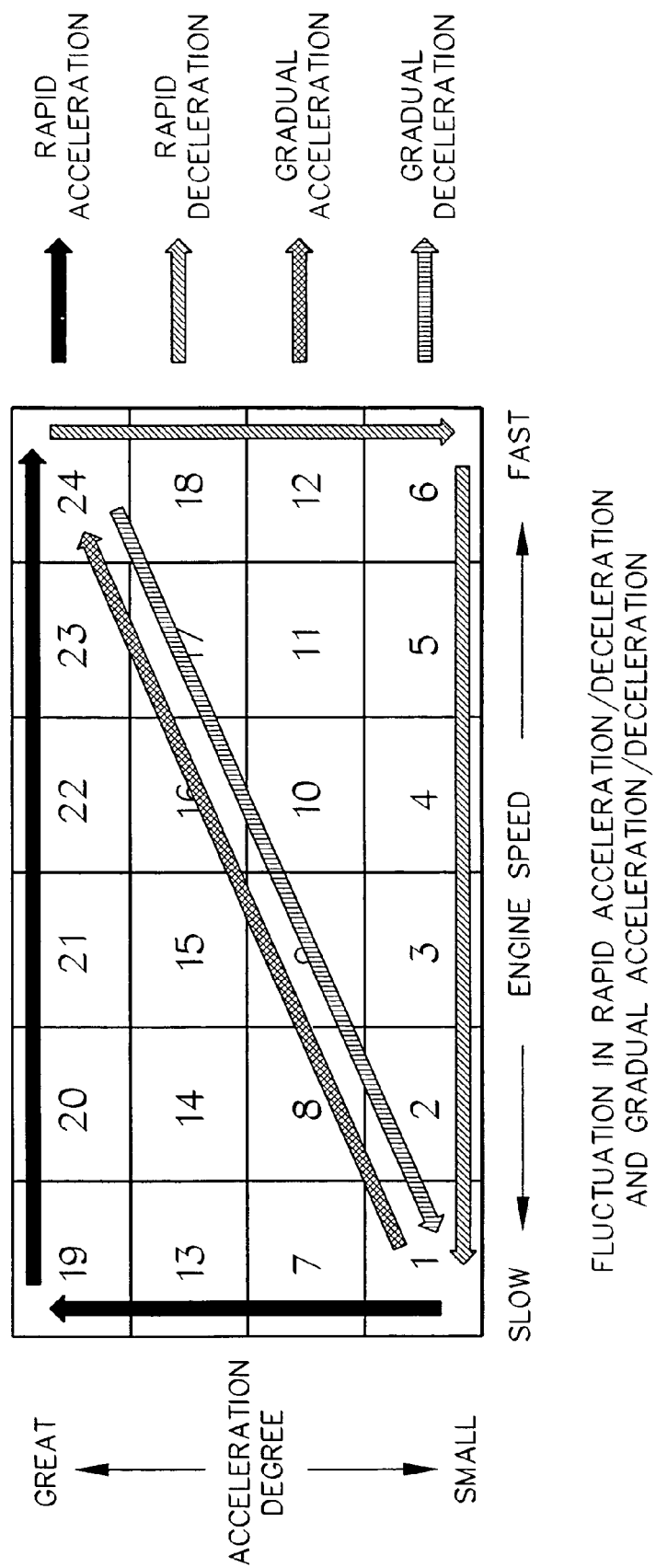
FIG. 5 illustrates the different orders in which the engine sound data stored in the memory in accordance with FIG. 2 are read at each rapid acceleration and rapid deceleration period.

The present invention is designed to cause the synthesized engine sound to change in as close a manner as possible to the actual sound alteration of an actual engine. More specifically, in the present invention, when the rapid acceleration/deceleration operations are conducted in the sound synthesizer 1, the sound control signals cause the engine sound data to be read out from the memory 6 in an order that more closely simulates the actual engine sounds. For example, for rapid acceleration followed by rapid deceleration, the data stored in the memory 6 (represented by the table in FIG. 2) are read out in a different order. In particular, as illustrated in FIG. 5, the engine operational state shifts along the lines 1-19-24-6-1.

Furthermore, for the gradual acceleration/deceleration, in reality, a force to accelerate the engine flywheel and the vehicle body becomes so small that it may be ignored. The gradual acceleration/deceleration can be performed with substantially the same acceleration degree. Thus, each engine sound data is read out in order in response to the sound control signals, and the engine operational state shifts along lines 1-24-1, as shown in FIG. 5.

The sound control signals command the synthesized sound output generator 7 to read the engine sound data from the memory 6 depending on the engine operational state. The engine data under each engine operational state stored in the memory 6 has each sound pressure waveform matching the firing interval between each cylinder. In order to reproduce data having such extremely short sound pressure waveforms as the engine sound, the engine sound data are played at the interval matching the firing interval between each cylinder.

Examples of such sound control signals are the MIDI (Musical Instrument Digital Interface) sound control signals. MIDI is the world standard format for the electronic instrument play data regulated by International Midi Association for communicating the music information of electronic instruments. The engine sound data is primarily read to the synthesized sound output generator 7 based on velocity specified by the sound control signals and musical intervals (which, in a MIDI device used to emulate a keyboard instrument, for example, is responsive to a depressing speed of a key of the keyboard instrument to control the sound volume), and is thereby outputted as voltage signals from the synthesized sound output generator 7.

The sound control signals in the MIDI standard require 30 bits per each command. The communication speed is 31.25 kbps, thus providing a capacity to send a maximum of 1,042 commands per second. However, it is necessary to send two commands, ON and OFF, when producing sounds. Thus, the limit for producing the sound control signals is about 521 sounds per second.

The production of about 521 sounds per second is equivalent to an engine speed of approximately 15,630 rpm for a four-cycle engine having four-cylinders. Thus, 521 sounds per second is sufficient for producing normal engine sounds. However, 521 sounds per second are not enough when using plural cylinder engines, such as Formula-One (F-1) engines, that produce high ranges of sound, or when plural vehicle sounds are produced simultaneously, or when music is played. For a solution, one sound control signal is arranged to produce plural sounds at a random interval. However, since this is beyond the control of the normal MIDI command, a new function needs to be added.

With respect to this point, for example, the sound source and sound control signal in the sound synthesizer 1 are conformed to the MIDI standard. Further, another function is added in which the engine sound read from the memory 6 by one sound control signal is played for plural times for a specified duration. With an inexpensive MIDI sound source unit, the engine sound is produced with a shorter time interval than an interval restricted by the communication speed of the MIDI standard. With this arrangement, the synthesizing of the high speed sound created by the F-1 plural cylinder engines can be produced.

Figure 6:
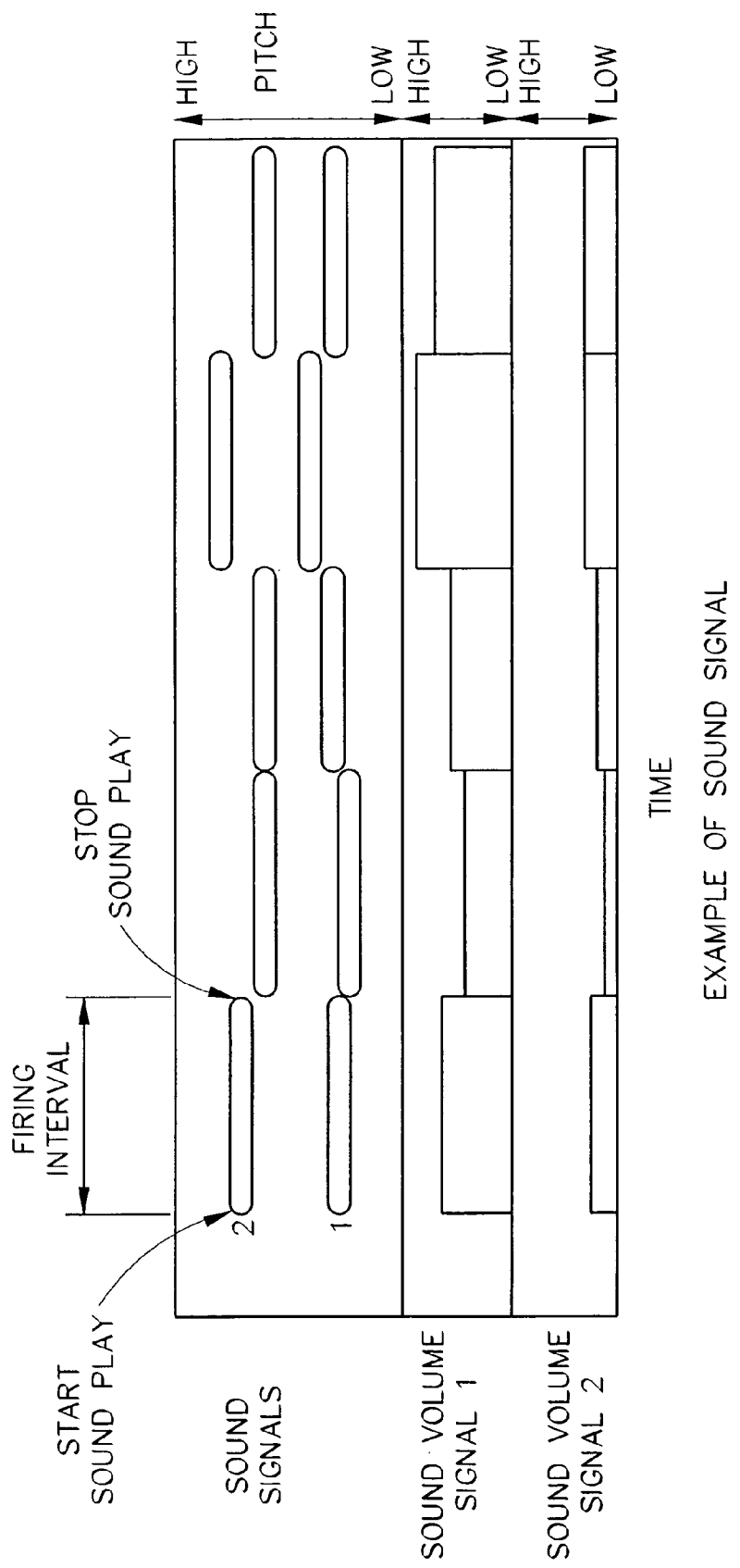
FIG. 6 illustrates an example of control signals outputted from the sound controller of the sound synthesizer of FIG. 1.

FIG. 6 illustrates the sound control signals outputted from the sound controller 5. In this embodiment, for each engine sound data for each operational state, if a sound control signal with a wavelength matching a firing interval of each cylinder is repetitively outputted, two kinds of sound signals having different pitch are outputted simultaneously with different sound volume. Thereby, the sound volume, pitch and tone are modified per each sound control signal at each time.

In particular, if engine sound data during a certain operational state is viewed, as illustrated in FIG. 3, actual engine sound represents unstable fluctuated sound pressure waveforms per each fluctuating firing. The fluctuation of the sound pressure waveforms provides various sounds, unlike monotone sounds such as a buzzer. If only one sound pressure waveform with a length corresponding to a firing interval of each cylinder is randomly extracted and simply repeated, the synthesized engine sound becomes monotone, compared with the actual engine sound.

Upon consideration of such disadvantage, in this embodiment, plural sound signals with different pitch are outputted simultaneously with different rates. The read-out engine sound data is controlled so that the sound volume, pitch and tone fluctuate per each sound control signal, causing fluctuations to the reproduced sound that are repeated short sound pressure waveforms. As a result, the synthesized engine sound, which is produced based on the engine sound data within a certain operational state, sounds more natural.

Furthermore, in this embodiment, when digital data read from the memory 6 is outputted by the synthesized sound output generator 7 as a voltage signal corresponding to the sound pressure waveform, a reproduction rate is changed when the digital data is converted to analog data depending on a ratio between the actually recorded engine speed and the calculated engine speed.

Figure 7A:
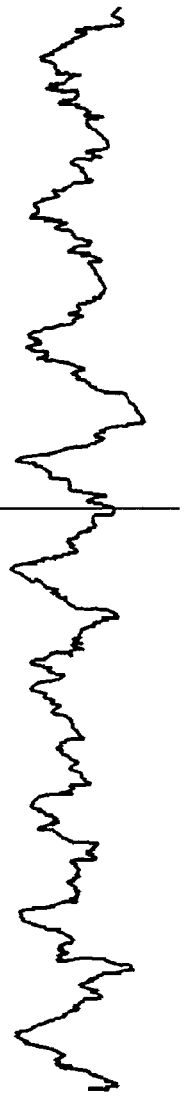
FIGS. 7A and 7B, illustrates sound waveforms of the synthesized engine sound when a reproduction rate for converting digital data to analog data is not changed (FIG. 7A) and is changed (FIG. 7B) at the time when the synthesized engine sound is outputted from the sound control means of the sound synthesizer of FIG. 1.
Figure 7B:

In particular, as illustrated in FIG. 7A, if each engine sound data recorded in the middle of each operational state is reproduced at the same rate no matter where the engine speed is located within the particular operational state as it moves to the next state from one operational state, the pitch of the synthesized engine sound changes drastically. However, in the present invention, the reproduction rate is modified depending on the calculated engine speed. Thereby, as illustrated in FIG. 7B, the pitch of the synthesized engine sound remains unchanged as much as possible at a border of two different operational states.

According to the above-described sound synthesizer 1 in the present invention, various types of synthesized engine sounds can be created for various types of engine operational states. Further, the engine sound data stored in the memory 6 has the same very short wavelength as the firing interval between each cylinder. Therefore, a list of those various types of engine sound data does not increase the memory capacity.

Furthermore, the hardware required for the sound synthesizer 1 does not differ much from the hardware used for the conventional actual sound loop reproduction method. Thereby, existing synthesizers can be utilized.

In this embodiment, the engine sound data is repetitively played by using the sound pressure wavelength matching the firing interval between each cylinder. The same engine sound data can be utilized for producing the synthesized sound for engines with different number of cylinders and different cylinder alignment if a different method for controlling the sound play intervals is adopted.

In this embodiment, the sound control signals that are repetitively outputted at the interval corresponding to the firing interval between each cylinder are controlled, whereby the sound volume, pitch and tone of the engine sound data at each operational state that are read from the memory 6 can be modified at random per each transmission of the sound control signals. Although the synthesized engine sound is reproduced by repeating one engine sound data recorded at one particular engine operational state, the produced sound containing dispersed firing are widely accepted as the natural engine noise.

In this embodiment, when digital data read from the memory 6 are outputted by the synthesized sound output generator 7 as a voltage signal corresponding to the sound pressure waveform, a reproduction rate is changed when the digital data is converted to analog data depending on a ratio between the actually recorded engine speed and calculated engine speed. With this arrangement, the same pitch can be sustained in the border of two adjacent operational states. Thereby, the transition of the synthesized sound from one operational state to another state can become smooth and natural.

In this embodiment, the engine sound data stored in the memory 6 has a sound pressure wavelength that substantially corresponds to the firing interval between each cylinder. For example, even if this wavelength is slightly longer or 2-3 times longer than the firing interval, as long as it is apparently different from the actual sound in a duration of a few seconds, the arrangement of this embodiment is available.

In this embodiment, the sound volume, pitch and tone of the synthesized sound is randomly modified in order to imitate the actual engine sound as much as possible. In addition, the reproduction rate can be modified depending on the engine speed calculated by the system. This additional requirement may be omitted depending on how close the engine synthesized sound is to the actual sound.

Figure 8:
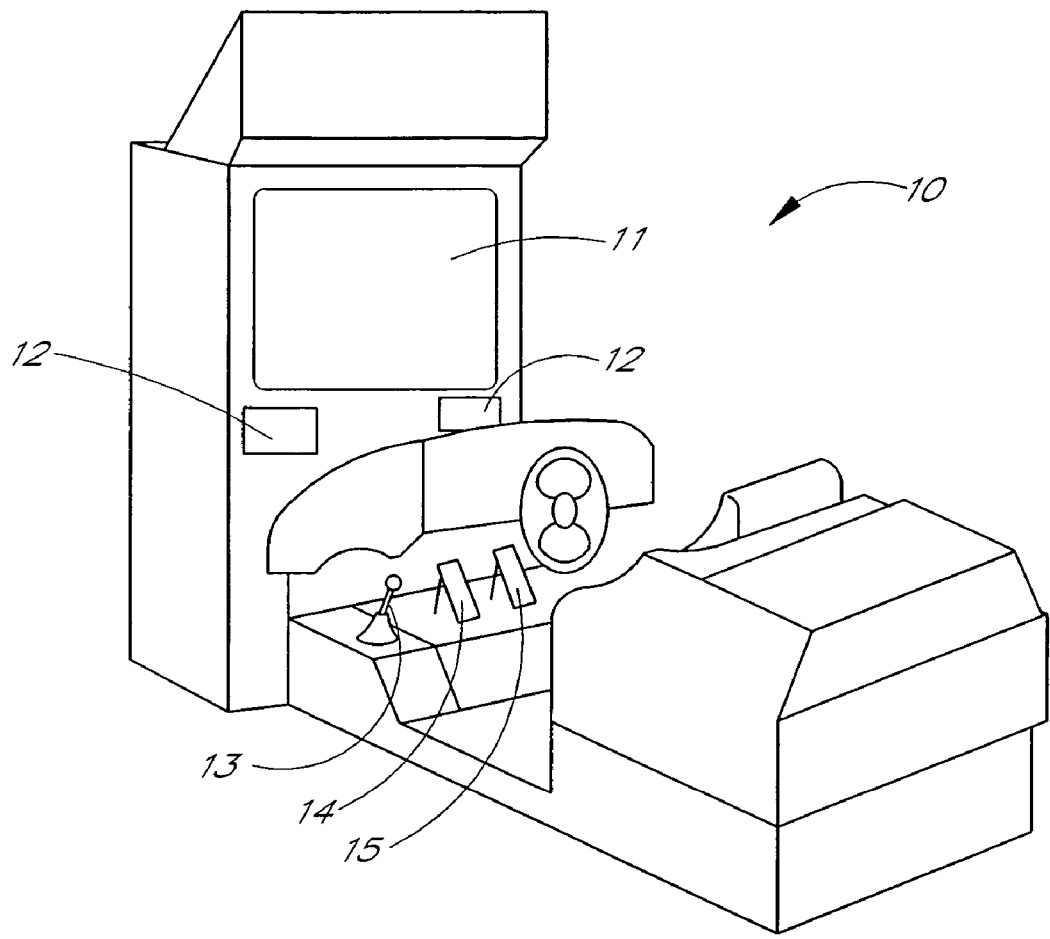
FIG. 8 illustrates a perspective view of an exemplary arcade game machine into which the sound synthesizer of the present invention is incorporated.

The above-described sound synthesizer 1 can be employed for various purposes. For example, FIG. 8 illustrates an arcade game machine used in the game center. An arcade game machine 10 or an automobile racing game comprises a display screen 11, a speaker 12, a shift lever 13, an acceleration pedal 14 and a brake pedal 15. The sound synthesizer 1 is installed in this machine with the shift lever 13, the acceleration pedal 14 and the brake pedal 15 corresponding to the operation input device 2 of FIG. 1. The synthesized engine sound is played through the speaker 12 with the quality as close to the actual engine sound as possible.

Figure 9:
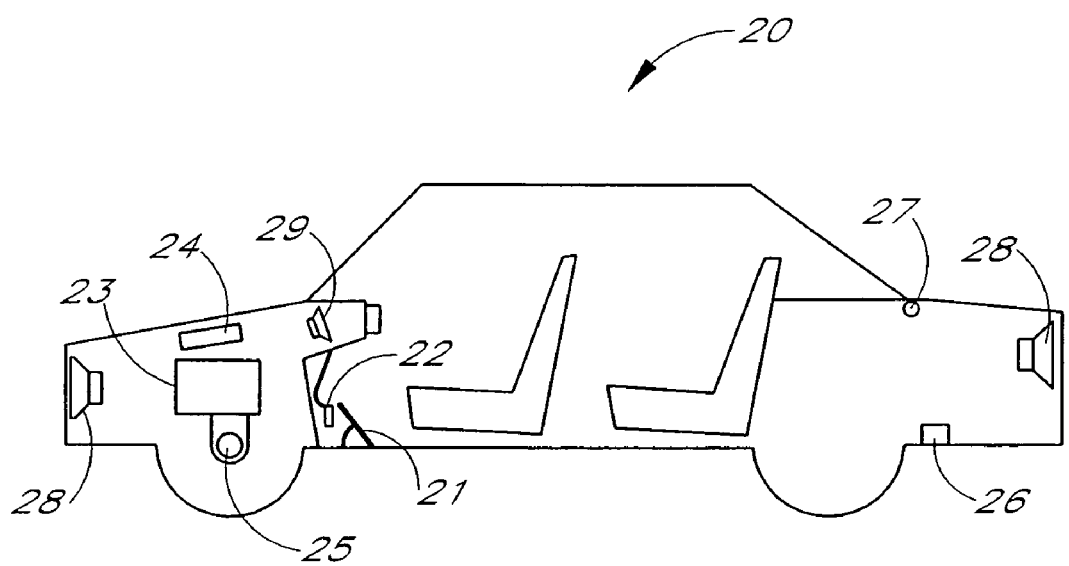
FIG. 9 illustrates a pictorial view of an electric automobile into which the sound synthesizer of the present invention is incorporated.

FIG. 9 shows an automatic electric car 20 driven by an electric motor powered by an on-board battery. The electric car 20 includes an acceleration pedal 21 and brake pedal 22 as the operation input devices. Further, a power unit 23 (the electric motor and the transmission unit) is also located on-board the car 20. In addition, each type of electronic circuit, including a controller of the power unit and an electronic control unit 24, including CPU, memory and amplifier, is also provided.

The electric car 20 also includes a speed detector 25, an external load detector 26, a surrounding noise detector 27 for detecting noise around the vehicle, a load detector (not shown) for detecting how much the acceleration pedal 21 is depressed, and a braking force detector (not shown) for detecting how much and how fast the brake pedal 22 is depressed. These detectors deliver signals to a power unit controller inside the control unit 24. The speed detector 25 detects the speed of the automobile by recognizing the moving direction, forward or rear, based on the rotating direction of the front wheels. The external load detector 26 detects the inclination in the forward/rear directions and flat running condition of the vehicle body.

For such an electric car 20, the sound synthesizer 1 as described in this embodiment is installed in the control unit 24. The acceleration pedal 21 and brake pedal 22 are considered to be the operation input devices. The speed detector 25, external load detector 26, braking force detector and load detector are considered to be the operating amount detector. The synthesized engine sound is played by each amplifier inside the control unit 24 through speakers 28 aimed to the outside of the automobile and another speaker 29 aimed to the inside at an appropriate sound volume depending on detected results from the surrounding noise detector 27. With the above-described arrangement, the synthesized engine noise coming from the speakers becomes as real as possible.

Furthermore, since electric automobiles and electric motorcycles are very quiet on the road surfaces, pedestrians often do not hear the usual engine sound. Thus, they often cannot detect possible hazard. For the public safety, it may be required to install an engine sound synthesizer as described in the foregoing.

It should be understood that the present invention is not limited to the arrangement of the present invention. For example, the present invention may be applied to develop and design engine noise that is perceived as pleasant sound by people. Further, the present invention may be applicable to TV games, computer games, simulators, automobiles, motorcycles, airplanes, or ships.

In case of motorcycles, the throttle grip may be used as the operation input device. For airplanes, the throttle lever may be used as the operation input device. For personal computer games, the keyboard and mouse may be used as the operation input device.

Figure 10:
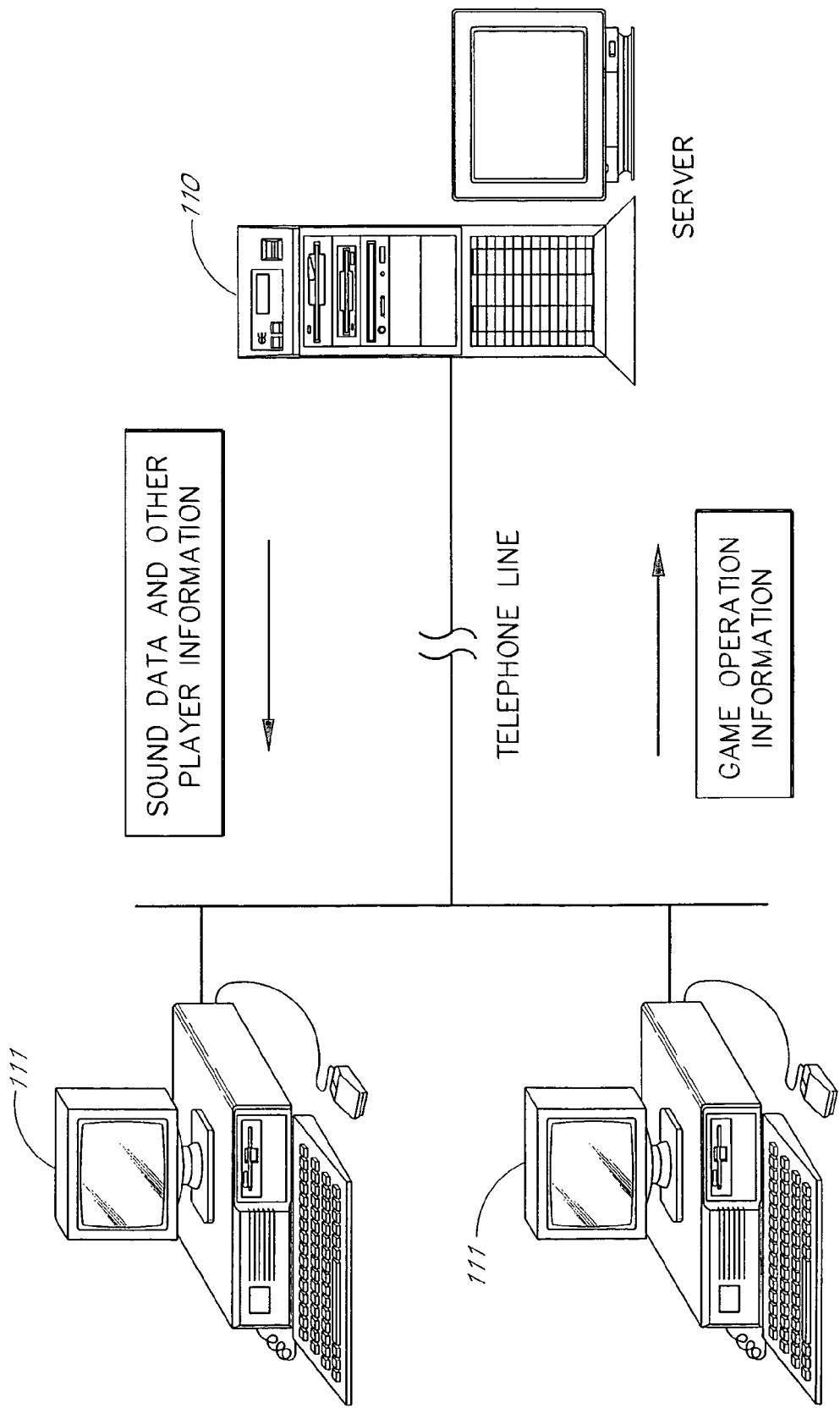
FIG. 10 illustrates an example of an online game that uses personal computers with the built-in sound synthesizers in accordance with the present invention.

FIG. 10 illustrates the online game by using general personal computers 111. The computers 111 used in the game are connected to a common server 110 by a communication link, such as, for example, a telecommunications system, the internet, or the like. In each hard disk of each computer 111, the same game software program is downloaded from the server 110 or downloaded from CD-ROMs or floppy disks.

Figure 11:
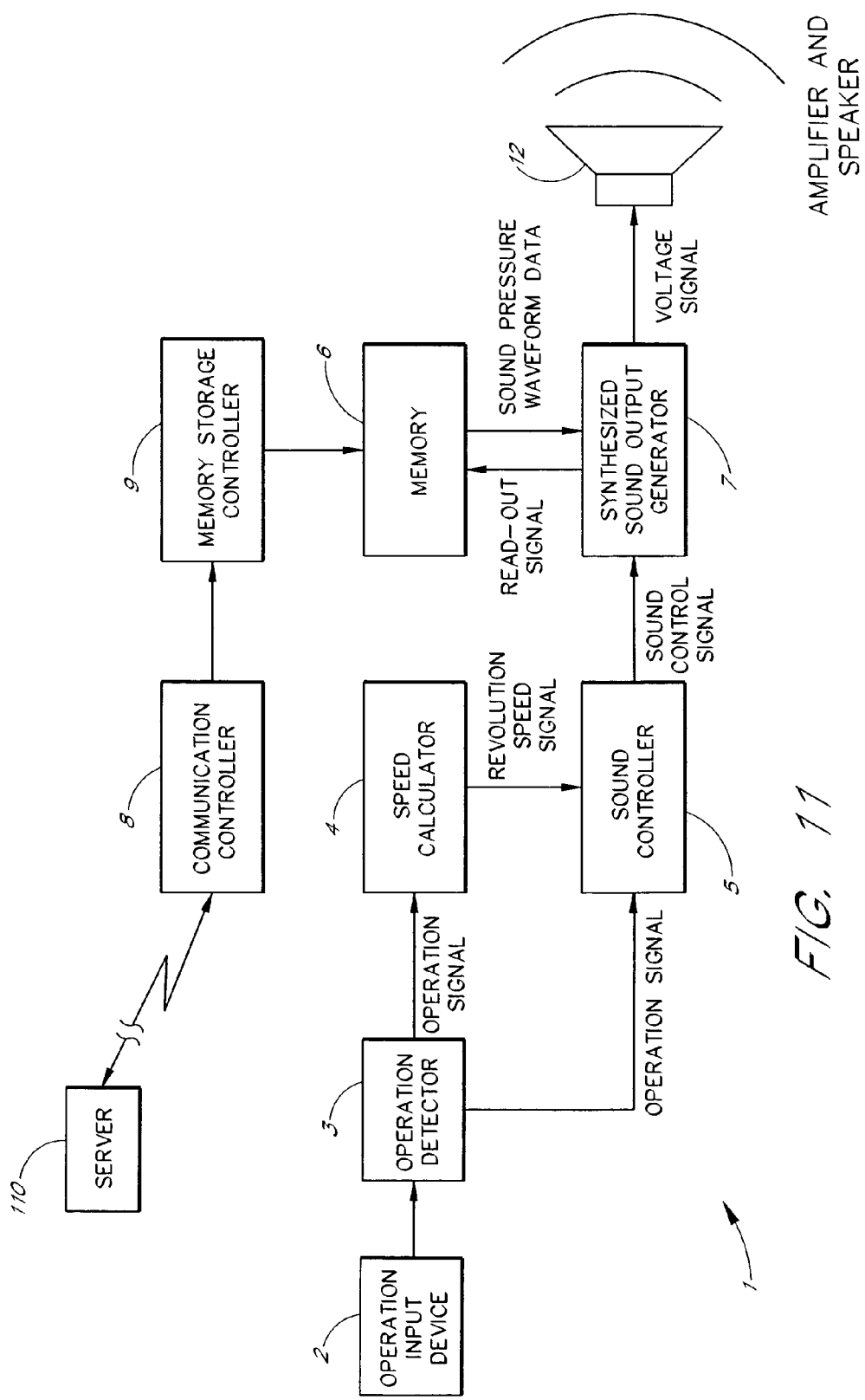
FIG. 11 illustrates a block diagram of the preferred embodiment of the vehicle sound synthesizer of FIG. 1 interconnected with a server that provides sound data to download to the memory within the synthesizer.

As illustrated in FIG. 11 (which corresponds to FIG. 1 with the addition of the server 110), the server 110 communicates with the communication controller 8 in each sound synthesizer 1 within each computer 111 to provide sound data to store in the memory 6 via the memory storage controller 9. Each keyboard and mouse associated with the respective computer 111 works as the operation input device 2 or the operation detector 3. The CPU of the computer 111 works as the speed calculator 4 and the sound controller 5. The sound synthesizer 1 is assembled into the personal computer 111 in the hardware of the personal computer 111.

Figure 12:
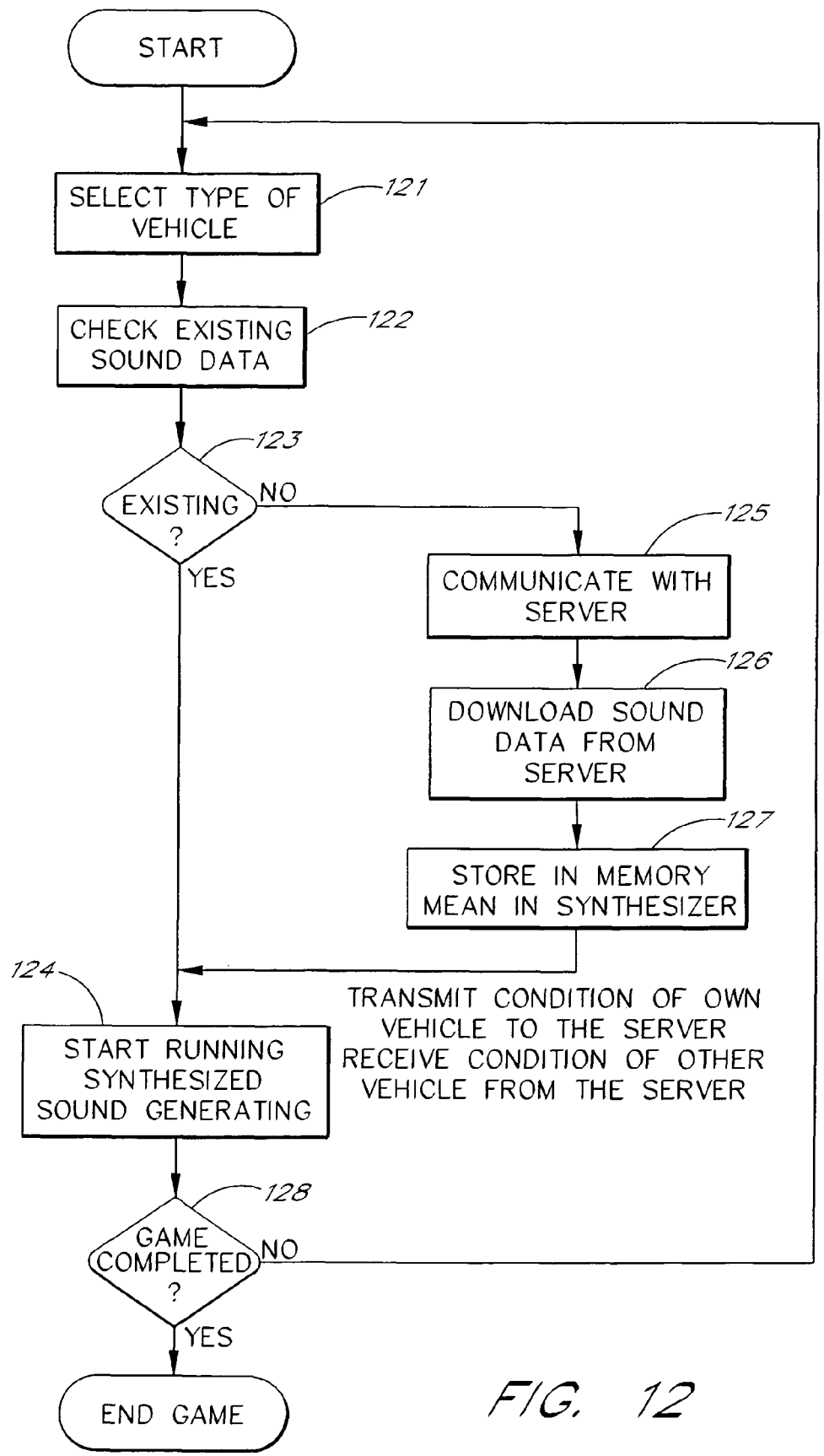
FIG. 12 illustrates a flowchart in which the online games are played by using personal computers with the built-in sound synthesizers in accordance with the present invention.

FIG. 12 is a flowchart illustrating the procedure of the online game. The game is initiated by retrieving the game from the hard disk. Before starting the game, a player selects a vehicle of choice as illustrated by a block 121. Then, as illustrated by a block 122, the player checks whether drive sound data corresponding to the vehicle of choice is stored in the memory 6 in the sound synthesizer 1 in the player's computer 111 (i.e., in the hard disk of the player's computer 111).

Then, as illustrated by a decision block 123, if the necessary drive sound data is found to be already stored in the memory 6, the online game begins by running the synthesized sound generation in a block 124 in combination with the visual effects of the game. If, in the decision block 123, the necessary drive sound data is not found in the memory 6, then, in a block 125, the player initiates communications with the server 110 through the communication line to download the drive sound data stored in the server 110 and store the data into the hard disk of the player's computer 111 (i.e., the drive sound data is stored in the memory 6), as illustrated by a block 126. Thereafter, play of the game is initiated, as illustrated by the block 124. The drive sound data stored in the memory 6 (hard disk) is reusable and erasable.

When a segment of the game is completed, the system checks to determine whether the game is completed in a decision block 128. If the game is not completed, the player is again presented the opportunity to select a vehicle in the block 121, and the system will then proceed as described above. Otherwise, if the system determines that the game is completed in the decision block 128, the game ends.

According to the present invention, the synthesized engine sound is played at the tone as close to the real engine sound as possible by using the engine sound data downloaded from the server 110 based on the operation signals and the engine speed signals. As discussed above, the engine sound data requires a very short recording time that matches the firing interval between the cylinders. For example, for a four-cycle, four-cylinder engine operating at 1200 rpm, the required duration of the engine sound data is only 0.25 seconds. Compared with the conventional actual sound loop reproduction method, the data volume becomes about 1/100 in the present invention.

For the online games, the necessary engine sound data can be downloaded at a very short time from the server through a telephone line. Thereby, users can select any kind of data from many selections and enjoy versatile sound effect of the online games.

Figure 13:
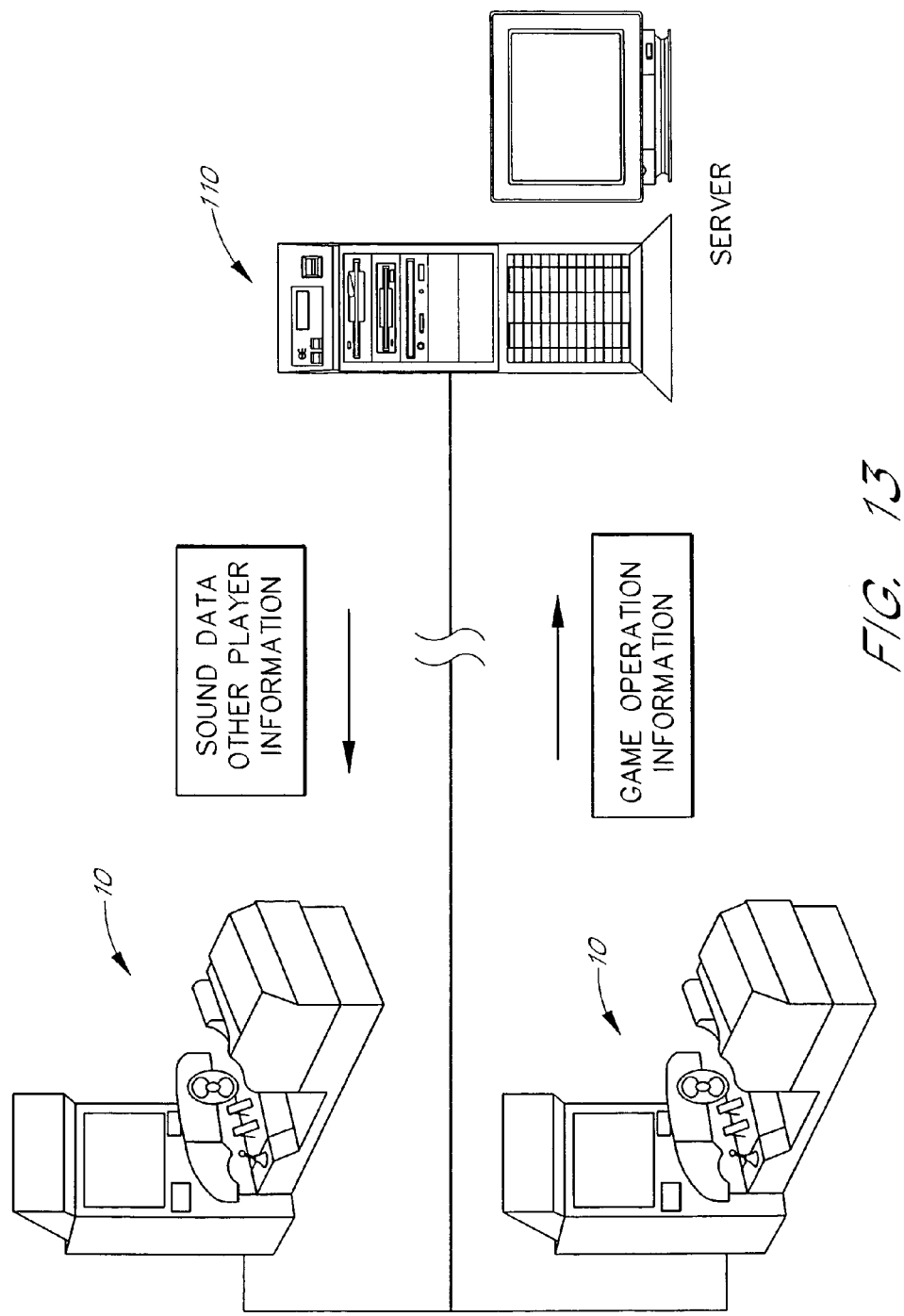
FIG. 13 illustrates arcade game machines with the built-in sound synthesizers in accordance with the present invention and interconnected with a server to enable games to be downloaded from the server to the game machines.

Furthermore, as shown in FIG. 13, the present invention is applicable for arcade game machines 12. The arcade game machines 12 simulate automobiles and are equipped with the shift levers, acceleration pedals and brake pedals, which are considered to be the operation input devices in the present invention. Each type of engine sound data is downloaded from the server 110 for serving many types of automobiles.

While preferred embodiments of this invention have been disclosed herein, those skilled in the art will appreciate that changes and modifications may be made therein without departing from the spirit and scope of the invention as defined in the appended claims.

What is claimed is:

1. A sound synthesizer for generating a sound that simulates the sound of an internal combustion engine having a plurality of cylinders, the sound synthesizer comprising:
   a memory arranged to store engine sound data corresponding to a plurality of operational states of the engine based on a firing interval of the cylinders; and
   an output generator arranged to output a voltage signal corresponding to a synthesized signal of first and second sound signals to a single speaker based on the engine sound data stored in the memory; wherein
   the output generator controls the first and second sound signals such that the first sound signal has at least one of a first pitch that is variable for each firing interval and a first volume that is variable for each firing interval, and the second sound signal has at least one of a second pitch that is variable for each firing interval independently of the first pitch of the first sound signal and a second volume that is variable for each firing interval independently of the first volume of the first sound signal.

2. The sound synthesizer according to claim 1, wherein the first pitch and the first volume of the first sound signal are varied at a first rate, and the second pitch and the second volume of the second sound signal are varied at a second rate different from the first rate to cause the sound synthesizer to generate sound having fluctuations in volume, pitch, and tone.

* * * * *